Dec. 5, 1967   L. E. HERR   3,356,176
VEHICLE SUSPENSION
Filed Feb. 3, 1966   3 Sheets-Sheet 1

INVENTOR.
Leroy E. Herr
BY
W. F. Wagner
ATTORNEY

Dec. 5, 1967    L. E. HERR    3,356,176

VEHICLE SUSPENSION

Filed Feb. 3, 1966    3 Sheets-Sheet 2

INVENTOR.
*Leroy E. Herr*
BY
*W. F. Wagner*
ATTORNEY

INVENTOR.
Leroy E. Herr
BY
W. F. Wagner
ATTORNEY 3,356,176
VEHICLE SUSPENSION
Leroy E. Herr, Lock Haven, Pa., assignor to General Motors Corporation, Detroit, Mich., a corporation of Delaware
Filed Feb. 3, 1966, Ser. No. 524,719
4 Claims. (Cl. 180—73)

This invention relates to vehicle suspension and more particularly to independent suspension for the driving wheels of a vehicle.

According to the general features of the invention, there is provided an independent rear wheel suspension for a vehicle of the type wherein live half axles extend laterally oppositely from a vehicle mounted differential and engage opposite traction wheels. Each of the wheels are rotatably mounted on wheel support members having depending extremities pivotally connected to opposite ends of a transversely extending beam which in turn is yieldably and guidingly connected to the vehicle superstructure by a pair of longitudinally extending laterally spaced leaf springs.

In a construction of the general type described, independent rear wheel suspension is achieved which retains the known benefits associated with independent wheel suspension while conferring added advantages in terms of simplicity and functional benefits normally associated with conventional leaf spring suspension.

The foregoing and other advantages and features of the invention will become more readily apparent as reference is had to the accompanying specification and drawings wherein.

Figure 1:
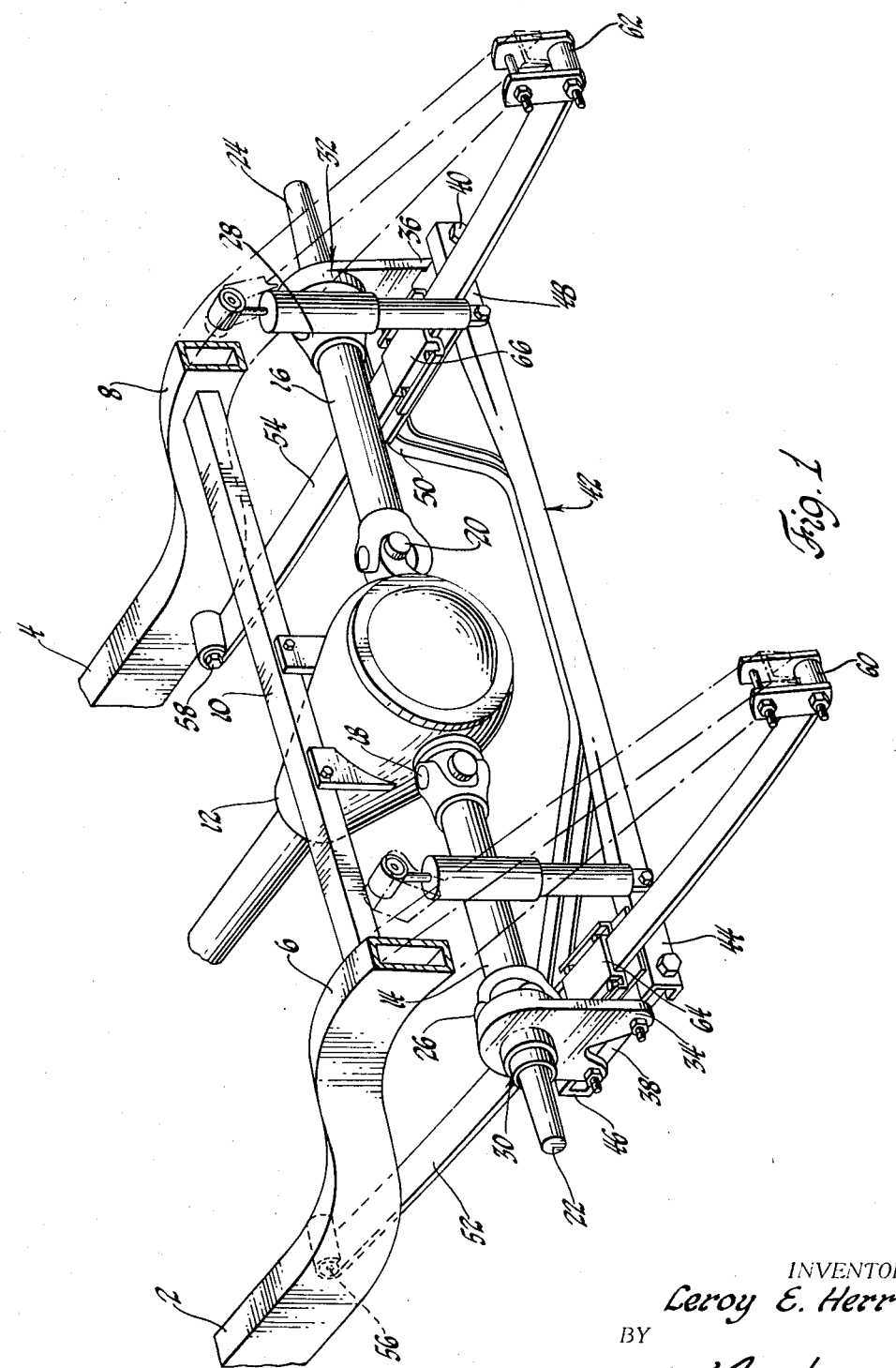
FIGURE 1 is a fragmentary perspective view of a vehicle chassis incorporating the invention.
Figure 2:
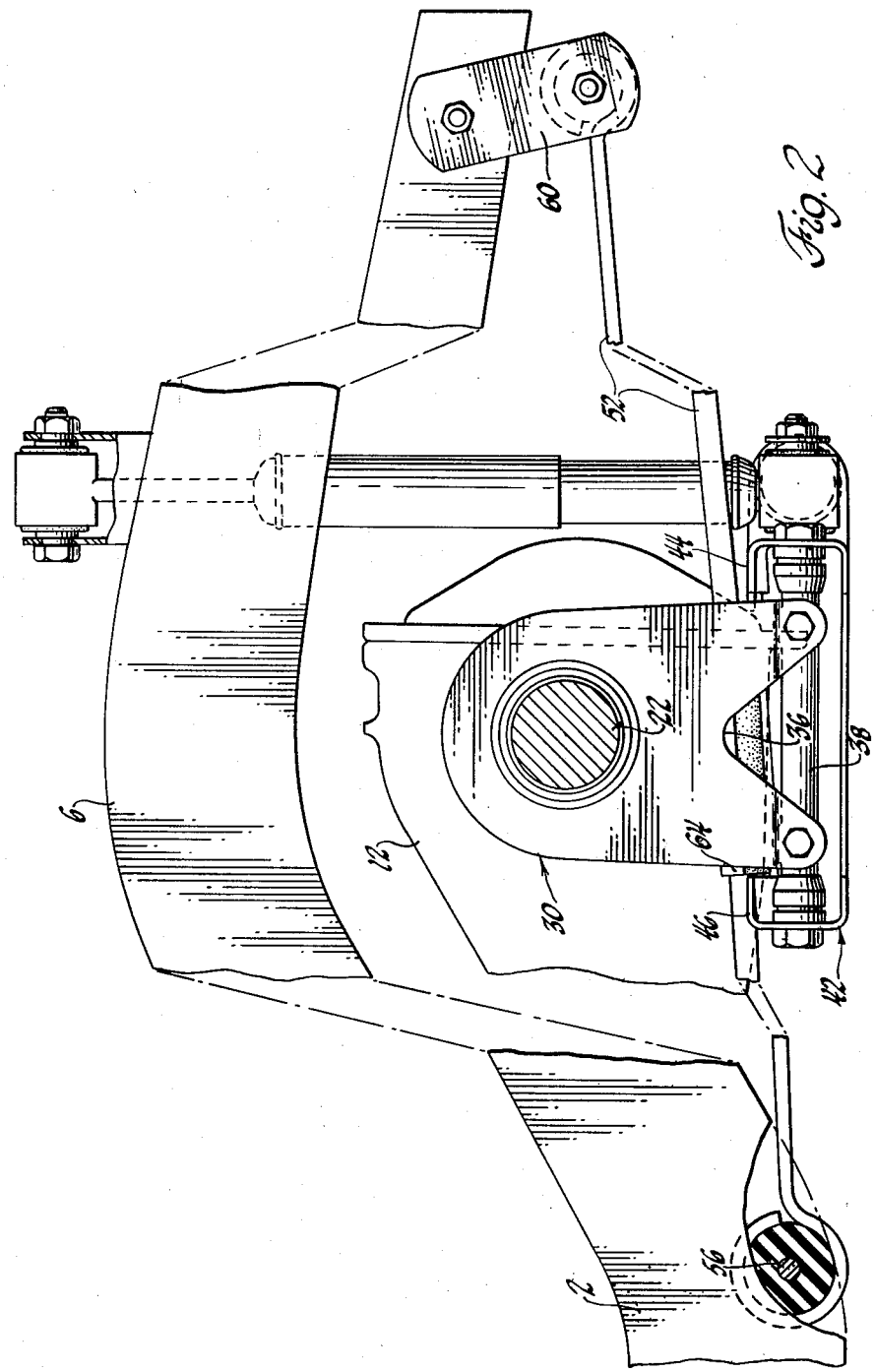
FIGURE 2 is a side elevational view, partly in section and with parts broken away.
Figure 3:
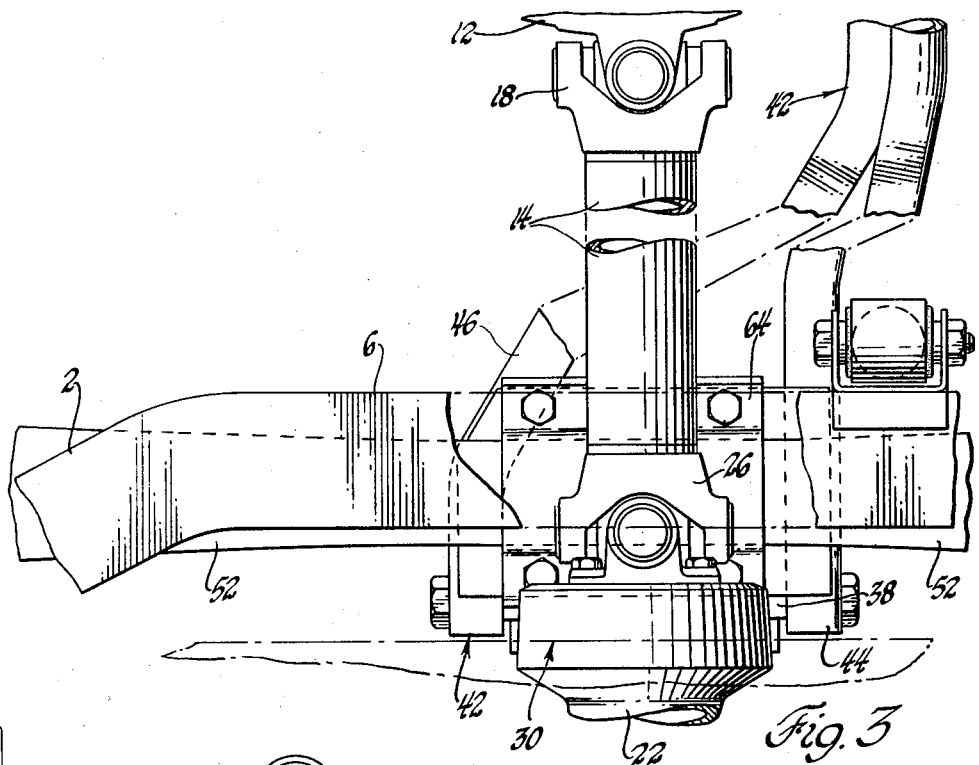
FIGURE 3 is a fragmentary top plan view, partly in section and with parts broken away.
Figure 4:
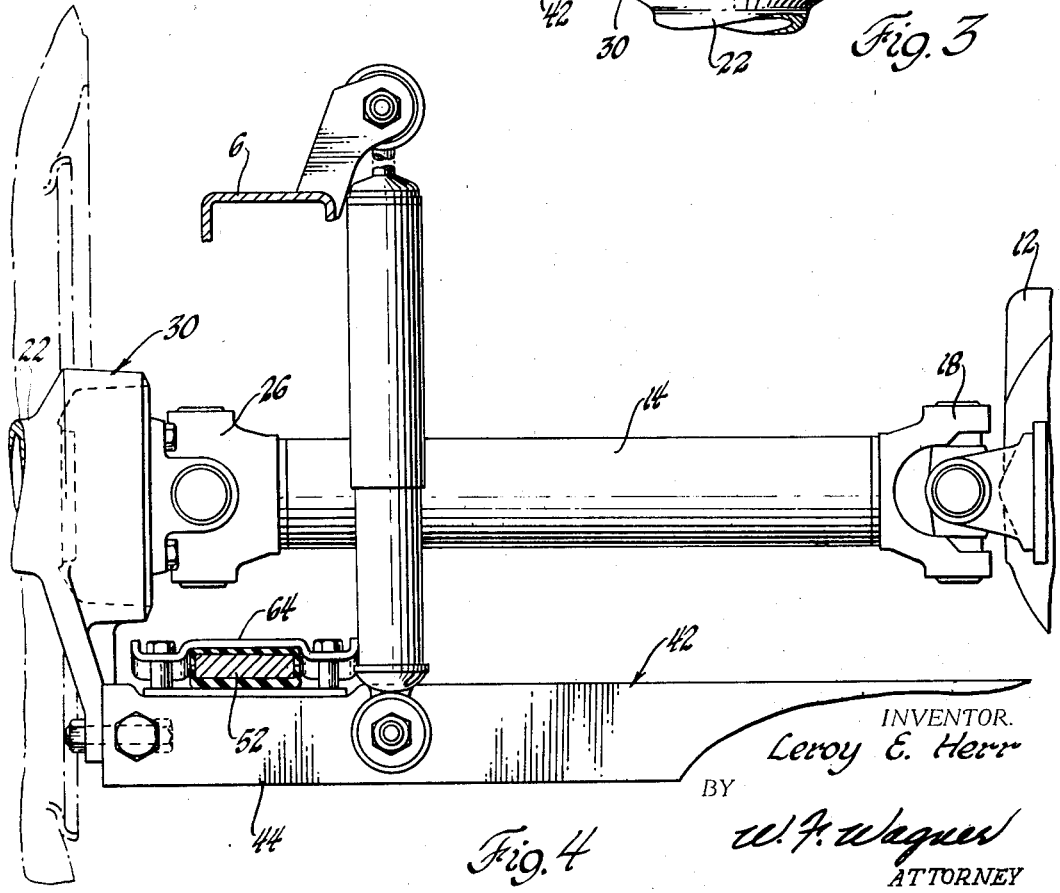
FIGURE 4 is an end elevational view, partly in section and with parts broken away.

Referring now to the drawings and particularly FIGURE 1, the reference numerals 2 and 4 generally designate vehicle frame side rail members which are connected together adjacent arched portions 6 and 8 by a frame cross member 10. Suspended beneath cross member 10 is a conventional vehicle differential assembly 12 which is operatively connected to laterally oppositely extending live half axles 14 and 16 by inboard universal joints 18 and 20. At their outboard ends, axles 14 and 16 are connected to wheel spindles 22 and 24 by outboard universal joints 26 and 28. Immediately laterally outboard of universal joints 26 and 28, spindles 22 and 24 are rotatably mounted in wheel spindle supports 30 and 32, each of which includes downwardly projecting portions 34 and 36 having longitudinally extending pivot shaft members 38 and 40 secured thereon. Extending transversely of the vehicle beneath and behind differential 12 is a beam 42. At each of its opposite ends, beam 42 is separated to form longitudinally spaced apart laterally projecting legs 44, 46 and 48, 50 which respectively engage the longitudinal opposite ends of shaft members 38 and 40.

To elastically support the wheel driving and guiding linkage thus far described, a pair of longitudinally extending laterally spaced leaf springs 52 and 54 are disposed beneath side rail members 2 and 4 and connected thereto by forward fixed pivots 56 and 58 and rearwardly disposed shackle assemblies 60 and 62. Intermediate their lengths, springs 52 and 54 are connected to beam 42 by sandwich clamps 64 and 66.

When arranged in the manner just described, the suspension linkage and associated elastic members provide an independent wheel suspension in which the path of independent wheel deflection is determined by the unequal angular deflection of each half axle and the beam 42. However, unlike conventional parallel link type independent suspension, the beam 42 provides an effective swing radius equal to its entire length with respect to displacement of a single wheel yet functions in a manner similar to a solid axle under conditions of corresponding deflection of both wheels. This arrangement not only is simpler and more economical than constructions utilizing separate lower links for each wheel, but also permits the utilization of conventional leaf springs as the elastic medium since the movement of the beam 42 in parallel ride deflection imposes no bending deflection on the leaf springs, while angular movement of beam 42 under conditions of single wheel deflection introduces only a minimal lateral component of movement to the deflected end of the beam. Further, even the modest lateral foreshortening which would occur under such circumstances is divided equally by the two leaf springs since the effective mounting of the opposite end of the beam is the opposite leaf spring.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a vehicle having a frame mounted differential, independent suspension comprising a pair of oppositely transversely extending live axles articulatably connected at their inner ends to said differential and at their outer ends to spindle mounted wheels, a spindle support at each side of the vehicle, a beam extending transversely between said supports yieldably connected to said frame by laterally spaced longitudinally extending leaf springs, and means pivotally connecting the opposite ends of said beam to said supports on longitudinally extending axes displaced vertically from the axis of rotation of said wheels.

2. The structure set forth in claim 1 wherein said beam includes bifurcated opposite ends located respectively forwardly and rearwardly of said wheel spindles.

3. The structure set forth in claim 2 including a pivot shaft member secured to each of said spindle supports having opposite ends pivotally engaging the bifurcated opposite ends of said beam.

4. The structure set forth in claim 3 wherein the midportion of said beam is spaced rearwardly of said differential.

No references cited.

A. HARRY LEVY, *Primary Examiner.*